United States Patent
An et al.

(10) Patent No.: US 9,575,234 B2
(45) Date of Patent: Feb. 21, 2017

(54) QUANTUM DOT CONTAINER AND RELATED DISPLAY DEVICE

(71) Applicant: SAMSUNG DISPLAY CO., LTD., Yongin-si, Gyeonggi-do (KR)

(72) Inventors: Jae-Sul An, Hwaseong-si (KR); Dong-Hoon Kim, Suwon-si (KR); So-Jeong La, Suwon-si (KR); Seung-Hwan Baek, Seoul (KR)

(73) Assignee: Samsung Display Co., Ltd. (KR)

( * ) Notice: Subject to any disclaimer, the term of this patent is extended or adjusted under 35 U.S.C. 154(b) by 151 days.

(21) Appl. No.: 14/473,601

(22) Filed: Aug. 29, 2014

(65) Prior Publication Data

US 2015/0268402 A1 Sep. 24, 2015

(30) Foreign Application Priority Data

Mar. 20, 2014 (KR) .................. 10-2014-0032540

(51) Int. Cl.
*F21V 7/04* (2006.01)
*F21V 8/00* (2006.01)

(52) U.S. Cl.
CPC .................. *G02B 6/0023* (2013.01)

(58) Field of Classification Search
CPC G02B 6/0023; G02B 6/0068; G02F 1/133615
See application file for complete search history.

(56) References Cited

U.S. PATENT DOCUMENTS

| | | | |
|---|---|---|---|
| 2009/0161361 A1* | 6/2009 | Meir | G02B 6/0065 362/238 |
| 2011/0141769 A1 | 6/2011 | Lee et al. | |
| 2011/0309325 A1 | 12/2011 | Park et al. | |
| 2012/0050649 A1 | 3/2012 | Yeo | |
| 2012/0075837 A1 | 3/2012 | Um | |
| 2012/0113671 A1 | 5/2012 | Sadasivan et al. | |
| 2012/0113672 A1 | 5/2012 | Dubrow et al. | |
| 2012/0127752 A1* | 5/2012 | Jung | G09F 13/18 362/602 |
| 2013/0108811 A1 | 5/2013 | Wada et al. | |
| 2013/0148376 A1 | 6/2013 | Nick et al. | |
| 2014/0160789 A1* | 6/2014 | Park | G02B 6/0023 362/608 |

FOREIGN PATENT DOCUMENTS

| | | |
|---|---|---|
| JP | 2013-068728 | 4/2013 |
| KR | 10-2011-0068110 | 6/2011 |
| KR | 10-2012-0002267 | 1/2012 |
| KR | 10-2012-0031798 | 4/2012 |
| KR | 10-2012-0048328 | 5/2012 |
| KR | 10-2012-0075142 | 7/2012 |
| KR | 10-2012-0122654 | 11/2012 |
| KR | 10-2013-0010966 | 1/2013 |

* cited by examiner

*Primary Examiner* — Andrew Coughlin
(74) *Attorney, Agent, or Firm* — Innovation Counsel LLP

(57) ABSTRACT

A quantum dot container may include a body having a cavity and a phosphor disposed inside the cavity. The body may include a light transmitting portion and a bent portion connected to one end of the light transmitting portion and extending at a predetermined angle with respect to an extension direction of the light transmitting portion.

20 Claims, 10 Drawing Sheets

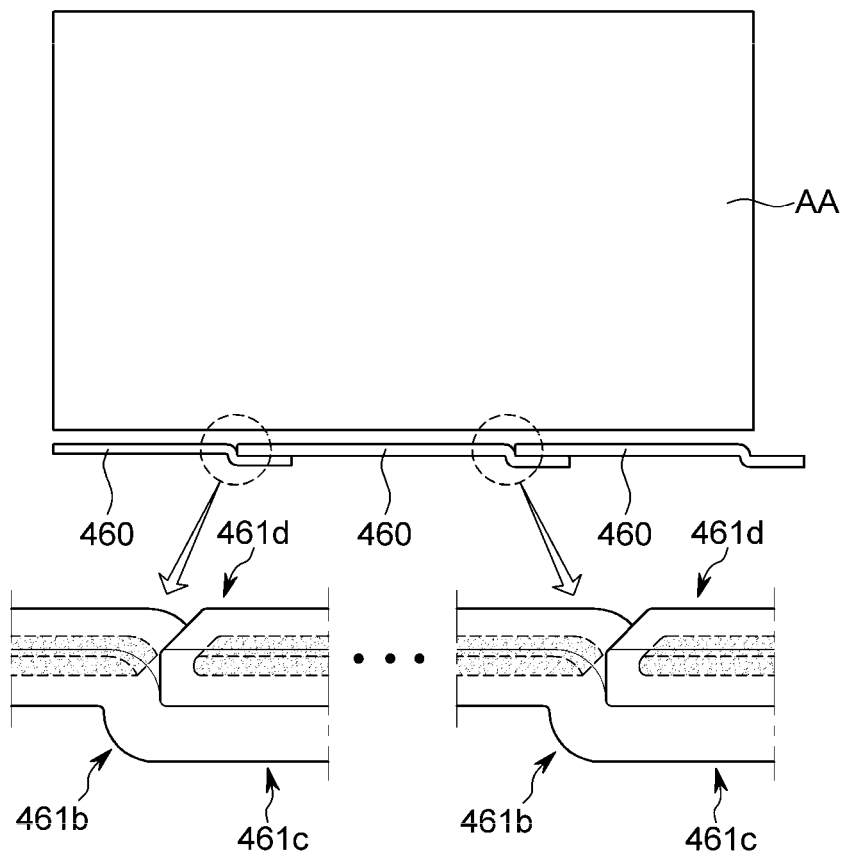

QUANTUM DOT CONTAINER AND RELATED DISPLAY DEVICE

CROSS-REFERENCE TO RELATED APPLICATION

This application claims priority to and the benefit of Korean Patent Application No. 10-2014-0032540, filed on Mar. 20, 2014, with the Korean Intellectual Property Office, the disclosure of which is incorporated herein in its entirety by reference.

BACKGROUND

1. Field

Embodiments of the inventive concept relate to a quantum dot container, and a display device that includes the quantum dot container.

2. Description of Related Technology

With the recent trend of low-carbon green economic growth all over the world, light emitting diodes (LEDs) which are regarded as a low-pollution eco-friendly product are being increasingly used as a backlight of various liquid crystal displays in order to reduce the energy consumption and the greenhouse gas.

A liquid crystal display (LCD) is a type of flat panel displays (FPDs), which is the most widely used these days. The liquid crystal display includes a liquid crystal layer which is interposed between two substrates having electrodes, so that liquid crystal molecules of the liquid crystal layer are rearranged upon applying voltage to the electrodes, thereby adjusting the amount of transmitted light.

A display device, such as a liquid crystal display (LCD), may include a display panel for displaying an image and may include a backlight assembly for supplying light to the display panel. The backlight assembly may include a light source.

A set of substantially low-power high-efficiency light-emitting elements, such as light-emitting diodes (LEDs) may be used as a light source in a backlight assembly. The LED light source may emit blue light.

The display device may include a thin pipe-shaped container filled with quantum dots ("quantum dot container") for converting the blue light from the LED light source to white light. The display panel may receive the white light for displaying various colors through, for example, color filtering.

This quantum dot container can be manufactured to have the maximum length of about 1000 mm and as the length of the quantum dot container is longer, it is difficult to be manufactured. For a large size display device, a plurality of quantum dot containers which are arranged in a low along an edge of a display panel is necessary to provide light to the large size display device. However, the quantum dot container inevitably includes a portion which does not include the quantum dots. Due to the portion of the quantum dot container which does not include the quantum dots, a non-emission area of the quantum dot container, the display device may have a substantially wide non-display bezel area. As a result, the size of the display device may be undesirably large.

It is to be understood that this background of the technology section is intended to provide useful background for understanding the technology disclosed and, as such, the technology background section may include ideas, concepts or recognitions that my not constitute a prior art.

SUMMARY

Embodiments of the inventive concept may be related to a quantum dot container that may have substantially short non-emission areas. Advantageously, a display device may have a substantially narrow bezel width, such that the display device may be substantially space-efficient. Embodiments of the invention may be related to the display device, which includes the quantum dot container.

According to an embodiment of the inventive concept, a quantum dot container may include a body having a cavity, and a phosphor disposed inside the cavity. The body may include a light transmitting portion, and a first bent portion connected to one end of the light transmitting portion and extending at a predetermined angle with respect to a direction in which the light transmitting portion extends.

The body may further include a first end portion extending from the bent portion substantially in parallel with the direction in which the light transmitting portion extends.

The first end portion may be a non-emission portion in which the phosphor is not disposed.

The body may further include a second bent portions connected to the other end of the light transmitting portion and extending at a predetermined angle with respect to a direction in which the light transmitting portion extends.

The first bent portion and the second bent portion may extend in different directions from each other.

The first bent portion and the second bent portion may extend in directions opposite to each other.

The first bent portion and the second bent portion may extend in a same direction.

According to an embodiment of the inventive concept, a display device may include: a display panel configured to display an image; a light source; a light guide member overlapping the display panel and overlapping the light source; and a first quantum dot container disposed between the light source and the light guide member. The first quantum dot container may include a light transmitting portion, the light transmitting portion including a first end and a second end, and a first bent portion connected to the first end and extending at a predetermined angle with respect to a direction in which the light transmitting portion extends.

The first quantum dot container further comprises a first end portion extending from the first bent portion substantially in parallel with the direction in which the light transmitting portion extends.

The first end portion may be a non-emission portion.

The display device may further include a second quantum dot container including a second bent portion and a second end portion. The first end portion of the first quantum dot container overlaps a second end portion of the second quantum dot container.

The display device may further include a second quantum dot container including a second bent portion and a second end portion. The first bent portion of the first quantum dot container may be in contact with the second end portion of a second quantum dot container.

The first quantum dot container may further include a second bent portion connected to the second end of the light transmitting portion and extending from the second end of the light transmitting portion.

The first bent portion and the second bent portion may extend in different directions from each other.

The first bent portion of the first quantum dot container may overlap an end portion of the second quantum dot container.

The first bent portion of the first quantum dot container is in contact with a second bent portion of the second quantum dot container.

The first quantum dot container may further include a second bent portion connected to the second end of the light transmitting portion and extending from the second end of the light transmitting portion.

The second bent portion may extend in a same direction as the first bent portion extends. The second bent portion may extend in a direction opposite to a direction in which the first bent portion extends. The display device may further include a second quantum dot container including a third bent portion and a third quantum dot container including a fourth bent portion. The first bent portion overlaps the third bent portion and the second bent portion overlaps the fourth bent portion.

According to embodiments of the inventive concept, a display device including a quantum dot container may have a satisfactorily narrow bezel, such that the display device may be satisfactorily space efficient.

Further, according to embodiments of the inventive concept, two or more quantum dot containers can be arranged in a row to cover an entire emission area, and thus it is easy to be applied to large size display devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 6A and 6B are a schematic plan view illustrating a quantum dot container according to an embodiment of the inventive concept mounted in a display device.

DETAILED DESCRIPTION

Figure 1:
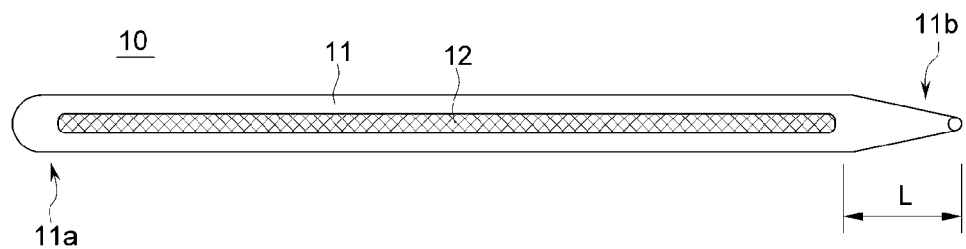
FIG. 1 is a schematic plan view illustrating a quantum dot container according to an embodiment of the inventive concept.

Hereinafter, embodiments of the inventive concept are described with reference to the accompanying drawings.

Example embodiments of the inventive concept are illustrated in the accompanying drawings and described in the specification. The scope of the inventive concept is not limited to the example embodiments and should be construed as including all potential changes, equivalents, and substitutions to the example embodiments.

In the specification, when a first element is referred to as being "connected" to a second element, the first element may be directly connected to the second element or indirectly connected to the second element with one or more intervening elements interposed therebetween. The terms "comprises," "comprising," "includes," and/or "including," when used in this specification, may specify the presence of stated features, integers, steps, operations, elements, and/or components, but do not preclude the presence or addition of one or more other features, integers, steps, operations, elements, and/or components.

Although the terms "first," "second," and "third" and the like may be used herein to describe various elements, these elements should not be limited by these terms. These terms may be used to distinguish one element from another element. Thus, "a first element" could be termed "a second element" or "a third element," and "a second element" and "a third element" can be termed likewise without departing from the teachings herein. The description of an element as a "first" element may not require or imply the presence of a second element or other elements. The terms "first," "second," etc. may also be used herein to differentiate different categories or sets of elements. For conciseness, the terms "first," "second," etc. may represent "first-type (or first-set)," "second-type (or second-set)," etc., respectively.

Like reference numerals may refer to like elements in the specification.

FIG. 1 is a schematic plan view illustrating a quantum dot container according to an embodiment of the inventive concept. The quantum dot container may have one or more features that may be analogous to or substantially identical to one or more features of a conventional quantum dot filled tube.

Referring to FIG. 1, the quantum dot container 10 includes a glass tube 11 and a phosphor 12 sealed in the glass tube 11.

The glass tube 11 may seal the phosphor 12 and may prevent penetration of moisture. The glass tube 11 may have a polygonal or oval cross-section.

The phosphor 12 is injected into the glass tube 11 that is in a vacuum state. The phosphor 12 is a substance that changes a wavelength of light. For example, the phosphor 12 can change a wavelength of blue light emitted from a blue LED light source so that the blue light can be converted into white light.

The phosphor 12 may include quantum dots. The phosphor 12 may further include at least one of sulfide, nitride, and oxide.

A quantum dot is a wavelength conversion particle that converts a wavelength of light so as to emit specific light. Quantum dots with different particle sizes may convert the blue light into light having different wavelengths. Therefore, light having a desired color can be obtained by adjusting a diameter of a quantum dot.

The phosphor 12 may include a green conversion particle and a red conversion particle, which may be quantum dots. The green conversion particle has a smaller diameter than the red conversion particle.

The quantum dot may generate a much stronger fluorescence effect than a general phosphor in a narrow wavelength range. The core of the quantum dot may be nano-sized groups II-IV semiconductor particles, for example, one or more particles of CdSe, CdTe, CdS, and the like.

For example, the quantum dot particle has a diameter in a range of about 2 nm to about 10 nm, and the particle size may be adjustable where necessary.

In the case where the quantum dot has a small diameter, a wavelength of light pass through the quantum dot has short wavelength such that blue-based light is generated. In contrast, when the size of the quantum dot increases, the wavelength of light pass through the quantum dot has longer wave length than the light pass through the quantum dot having a small diameter such that red-based light is generated.

The quantum dot may have a structure including an inner core and an outer shell surrounding the inner core. For instance, the quantum dot may include an inner core made of CdSe and an outer shell made of ZnS.

Wavelength conversion of light may depend on the sizes of the quantum dots. For example, light emitted from a blue LED light source passes through the quantum dots. The light passing through a small-sized quantum dot is converted to green light, the light passing through a large-sized quantum dot is converted to red light, and the light which does not pass through the quantum dots remains as a blue light.

Thus, these three colors of light of red R, green G, and blue B are mixed so that white light is produced. In an embodiment, the quantum dot with a small diameter may be a green conversion particle, and the quantum dot with a large diameter may be a red conversion particle.

Hereinafter, a manufacturing method for the quantum dot container 10 is described.

A glass tube 11 having a polygonal or oval cross-section is prepared. A first end portion of the glass tube 11 is heated to be sealed (in a first sealing process). Subsequently, air inside the glass tube 11 is removed through a second end portion, which is open, so that the glass tube 11 is in a vacuum state. In an embodiment, an air pump may be used to form a vacuum state.

Next, the phosphor 12 is injected into the glass tube, which is in a vacuum state. The injection of the phosphor 12 may be performed in nitrogen gas $N_2$ atmosphere. Heat is applied to the second end portion to seal the second end portion (in a second sealing process).

As described above, the inside of the glass tube 11 has been in a vacuum state before the phosphor 12 is injected into the glass tube, therefore, oxidation of the phosphor 12 may be prevented. That is, there should be substantially no water $H_2O$ and oxygen $O_2$ inside the glass tube 11.

In the first and second sealing processes, oxygen may be used to generate a high-temperature (~200° C.) flame for sealing the glass tube 11 by applying the flame to melt glass material.

Oxygen should not penetrate into the glass tube 11 during the second sealing process which maintains the glass tube 11 in a vacuum state.

The first sealing process is performed before the phosphor 12 is injected. The glass tube 11 is sealed using a high-temperature flame in a short period of time by melting glass material. As a result, as illustrated in FIG. 1, the first end portion 11a of the glass tube 11 can be sealed to have a relatively thin end portion of a glass wall by the first sealing process.

The second sealing process is performed after the phosphor 12 has been injected into the glass tube 11, such that the second sealing process may not be performed using a high-temperature flame to prevent a degradation of the quantum dots in the glass tube 11. Instead, relatively low temperature is applied to the glass tube 11 while pulling the glass tube in opposite directions for sealing the glass tube 11 in the second sealing process. Consequently, as illustrated in FIG. 1, the second end portion 11b of the glass tube 11 may have a longer end portion of a glass wall than the first end portion 11a.

A length L of the elongated glass portion of the second end portion 11b may be about 10 mm. This second end portion 11b may become a non-emission area (or non-conversion portion) because the phosphor 12 is not filled in the second end portion 11b. The second end portion 11b of the quantum dot container 10 constitutes a non-emission area (or non-conversion portion) of the quantum dot container 10.

Figure 2:
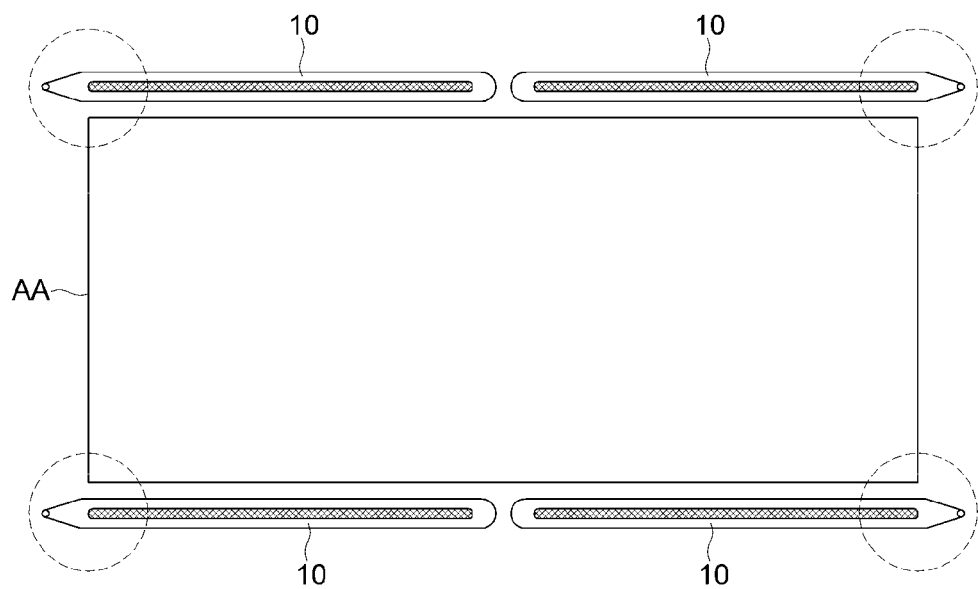
FIG. 2 is a schematic plan view illustrating a quantum dot container mounted in a display device according to an embodiment of the inventive concept.

FIG. 2 is a schematic plan view illustrating a quantum dot container mounted in a display device according to an embodiment of the inventive concept.

A quantum dot container 10 may be manufactured to have its maximum length of about 1000 mm because of difficulties of a manufacturing process as it becomes longer. Therefore, when the quantum dot container 10 is mounted on a large size display substrate, as illustrated in FIG. 2, a plurality of quantum dot containers 10 are arranged in a row along an edge of the display device.

Referring to FIG. 2, four quantum dot containers 10 are disposed at upper and lower portions of an active area AA (or display area) of the display device. The active area AA may be configured to display images according to image signals provided to the display device. In embodiments of the inventive concept, positions and the number of the quantum dot containers 10 may vary, for example, according to the size of the active area AA.

Referring to FIG. 2, the quantum dot container 10 does not include the phosphor 12 in the non-emission area (or non-conversion portion), and thus the non-emission area should be disposed outside the active area AA. The non-emission area may be covered by a bezel, which should have a sufficient width, for substantially hiding the non-emission area.

The quantum dot container 10 may be sealed to have a longer non-emission area with a length L of about 10 mm in order to prevent degradation of the quantum dots in the glass tube by heat and oxygen during the second sealing process. Inevitably a width of the bezel covering the non-emission area of the quantum dot container may be about 10 mm or more.

In the case where the quantum dot container 10 is used in a large size display substrate in particular, the bezel widths of both sides of the display device increase as illustrated in FIG. 2, due to limits of shapes of the quantum dot container 10.

Figure 3:
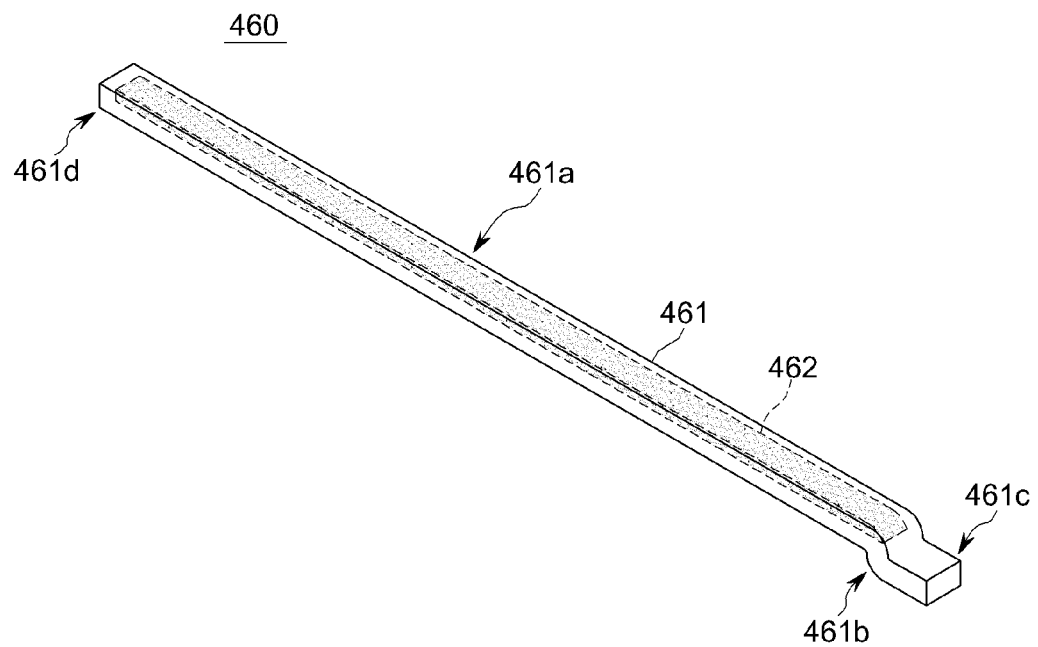
FIG. 3 is a schematic perspective view illustrating a quantum dot container according to an embodiment of the inventive concept.
Figure 4:
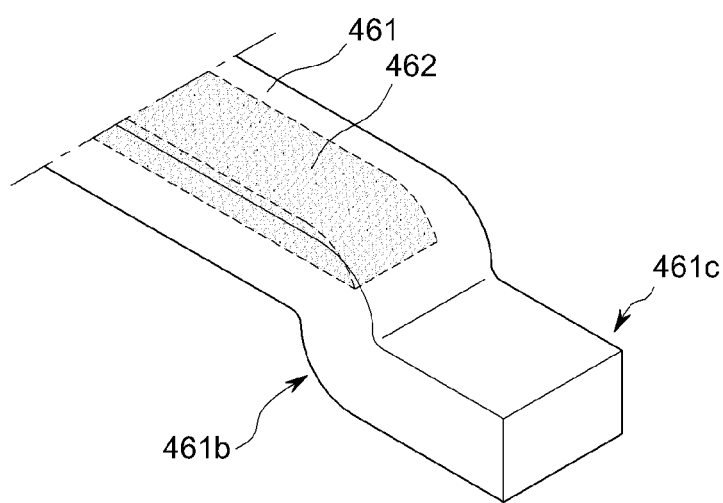
FIG. 4 is a partially enlarged view illustrating an end portion of a quantum dot container according to an embodiment of the inventive concept.
Figure 5:
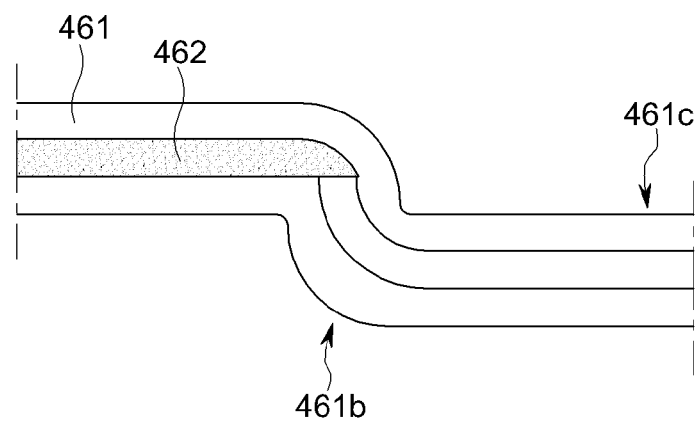
FIG. 5 is a cross-sectional view illustrating an end portion of a quantum dot container according to an embodiment of the inventive concept.

FIG. 3 is a schematic perspective view illustrating a quantum dot container 460 according to an embodiment of the inventive concept. FIG. 4 is a partially enlarged view illustrating an end portion of a quantum dot container according to an embodiment of the inventive concept. FIG. 5 is a cross-sectional view illustrating an end portion of a quantum dot container according to an embodiment of the inventive concept.

The quantum dot container 460 may have one or more elements and/or features that are substantially identical to or analogous to one or more elements and/or features of the quantum dot container 10 described with reference to FIG. 1 and FIG. 2. Descriptions for the identical or analogous elements may not be repeated.

Referring to FIGS. 3 to 5, the quantum dot container 460 includes a glass body 461 and a phosphor 462 sealed inside the glass body 461.

The glass body 461 includes a light transmitting portion 461a, a bent portion 461b extending from the light transmitting portion 461a at a predetermined angle with respect to a direction in which the light transmitting portion 461a extends, and a first end portion 461c extending from the bent portion 461b substantially in parallel with the direction in which the light transmitting portion 461a extends. For ease of description, an end portion of the glass body 461, which does not include the bent portion 461b, is defined as a second end portion 461d.

The light transmitting portion 461a and the bent portion 461b are an emission area including a phosphor, and the first and second end portions 461c and 461d are a non-emission area that does not include the phosphor.

According to an embodiment of the inventive concept, the second end portion 461d of the quantum dot container 460 may be sealed in the same manner as that of the quantum dot container 10. That is, the second end portion 461d may be sealed using a high-temperature flame in a short time by melting glass.

According to an embodiment of the inventive concept, the bent portion 461b of the quantum dot container 460 may be made after the second sealing process is performed. The first end portion is heated at a relatively low temperature to change in shape to have the bent portion 461b.

Figure 6B:
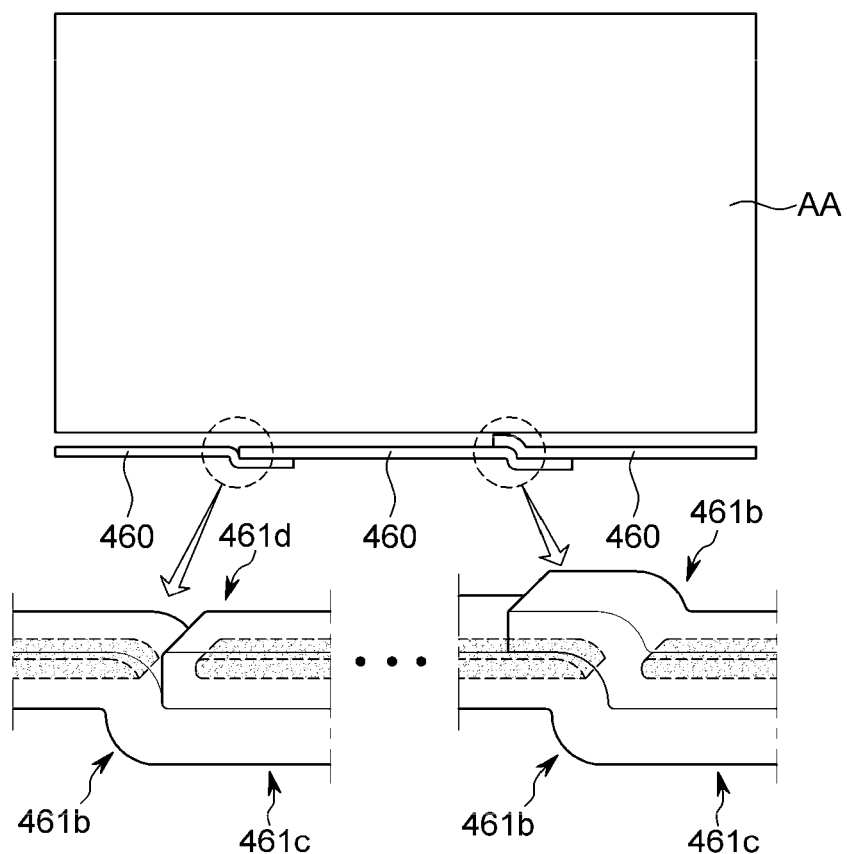

FIGS. 6A and 6B are a schematic plan view illustrating a quantum dot container according to an embodiment of the inventive concept mounted in a display device.

Referring to FIGS. 6A and 6B, three quantum dot containers 460 are disposed at a lower portion of an active area AA (or display area) of the display device. The active area AA may be configured to display images according to image signals provided to the display device. In embodiments of the inventive concept, positions and the number of the quantum dot containers 460 may be vary, for example, according to the size of the active area AA.

Referring to FIG. 6A, the three quantum dot containers 460 may be longitudinally aligned with each other at a lower portion of the active area AA.

In this case, the first end portion 461c of one quantum dot container 460 may overlap the second end portion 461d of another quantum dot container 460. The bent portion 461b of one quantum dot container 460 may be in contact with the second end portion 461d of another quantum dot container 460.

As illustrated in FIG. 6, the first end portion 461c of one quantum dot container 460 overlaps the second end portion 461d of another quantum dot container 460 so that the lower portion of the active area AA is almost entirely covered with the emission areas of the quantum dot container.

In the case where the quantum dot container 10 is applied to a large size display device (see FIG. 2), bezel widths of both sides of the display device increase, whereas in the case of the display device including the quantum dot container 460, a bezel width of at least one side of a large size display device may be reduced.

Referring to FIG. 6B, the three quantum dot containers 460 may be longitudinally aligned with each other at a lower portion of the active area AA.

In this case, the second end portion 461d of one quantum dot container 460 may overlap the first end portion 461c of another quantum dot container 460. The bent portion 461b of one quantum dot container 460 may be in contact with the bent portion 461b of another quantum dot container 460.

In the case where the quantum dot container 10 is applied to a large size display device (see FIG. 2), bezel widths of both sides of the display device increase, whereas in the case of the display device including the quantum dot container 460, a bezel width of both side of a large size display device may be reduced.

Figure 7A:
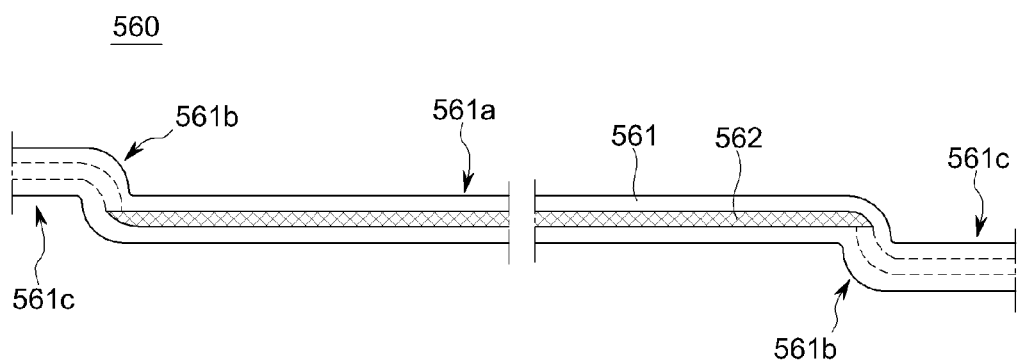
FIGS. 7A and 7B are a schematic cross-sectional view illustrating a quantum dot container according to another embodiment of the inventive concept.
Figure 7B:
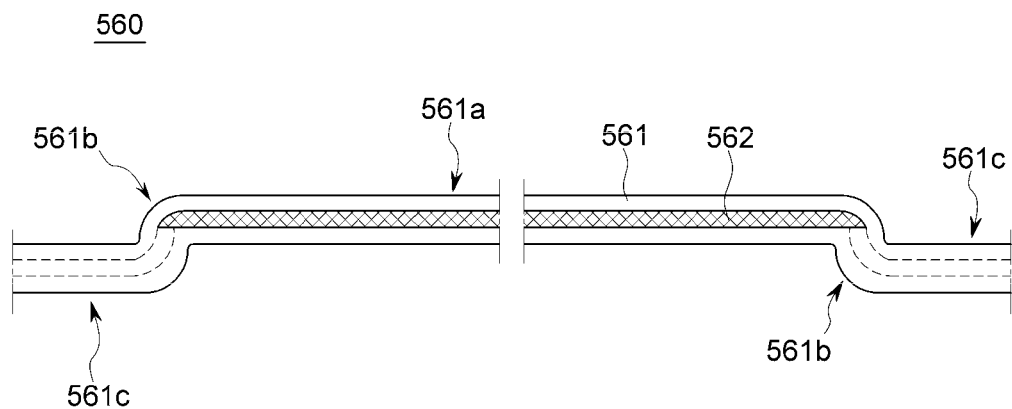

FIGS. 7A and 7B are a schematic cross-sectional view illustrating a quantum dot container according to another embodiment of the inventive concept.

According to another embodiment of the inventive concept, a quantum dot container 560 includes a glass body 561 and a phosphor 562 sealed inside the glass body 561.

The glass body 561 includes a light transmitting portion 561a, bent portions 561b each extending from both end portions of the light transmitting portion 561a at a predetermined angle with respect to a direction in which the light transmitting portion 561a extends, and end portions 561c each extending from both end portions of the bent portion 561b substantially in parallel with the direction in which the light transmitting portion 561a extends.

The bent portions 561b extend in different directions, respectively, from both end portions of the light transmitting portion 561a (see FIG. 7A). The end portions 561c are disposed substantially parallel to the light transmitting portion 561a. The bent portions 561b may extend in the same directions from both end portions of the light transmitting portion 561a (see FIG. 7B).

The light transmitting portion 561a is an emission area including a phosphor, and the bent portions 561b and the end portions 561c are a non-emission area that does not include the phosphor.

The bent portion 561b of the quantum dot container 560 may be heated at a relatively low temperature to change in shape after the second sealing process is performed.

Figure 8A:
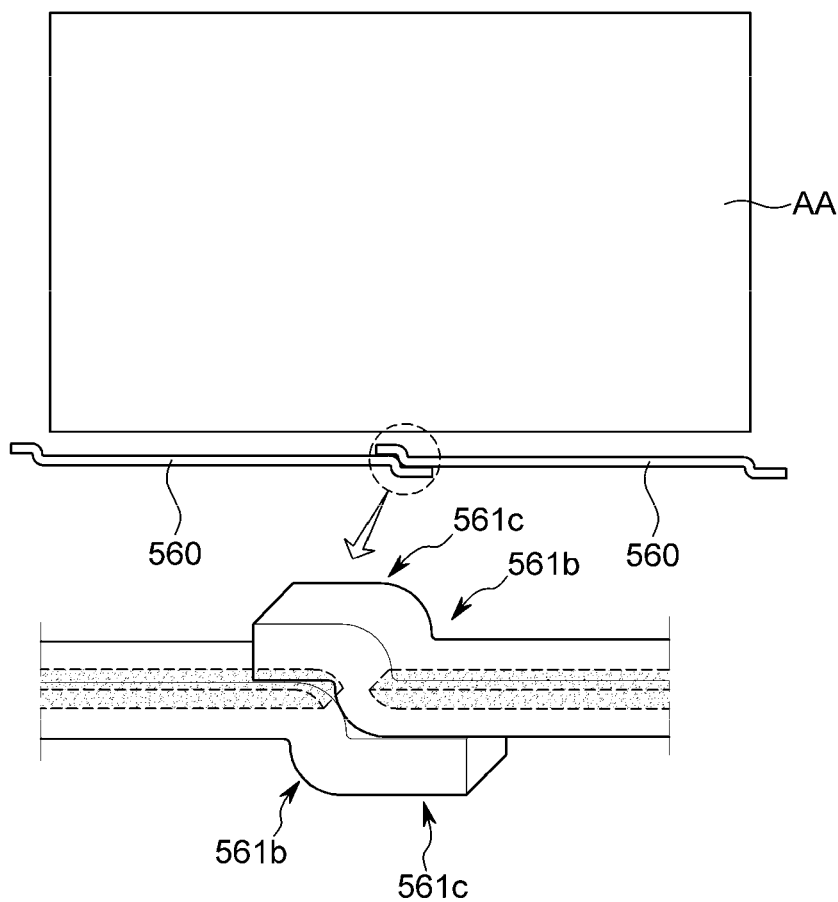
FIGS. 8A and 8C are a schematic plan view illustrating a quantum dot container according to another embodiment of the inventive concept mounted in a display device.
Figure 8B:
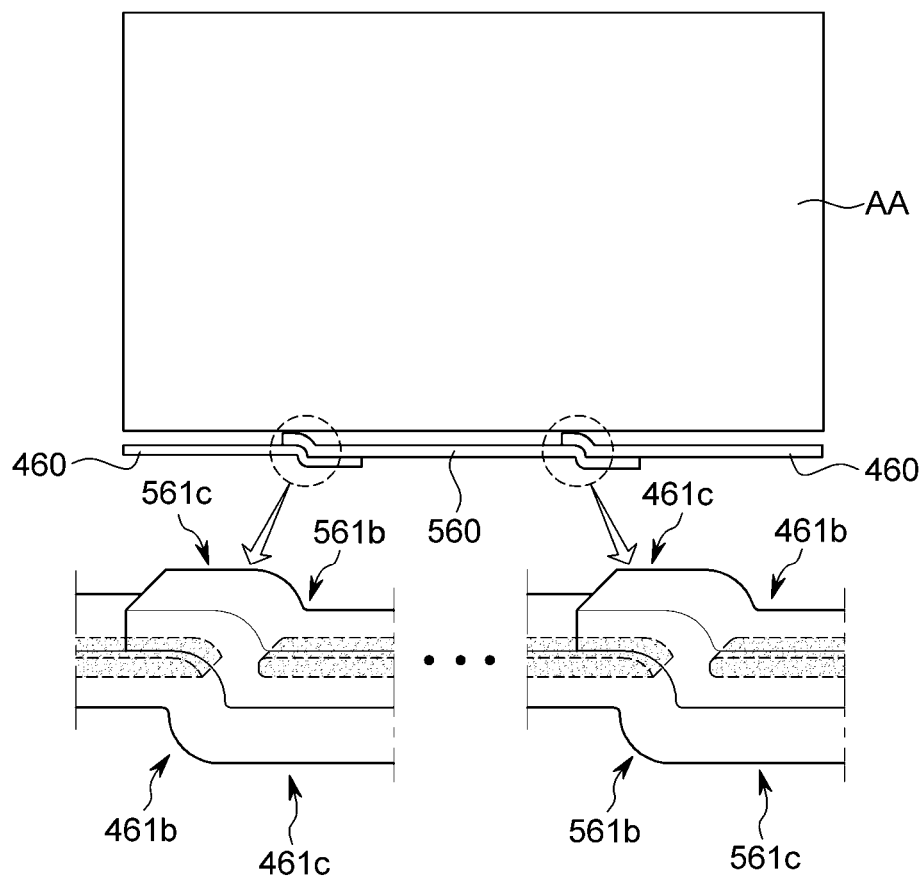
Figure 8C:
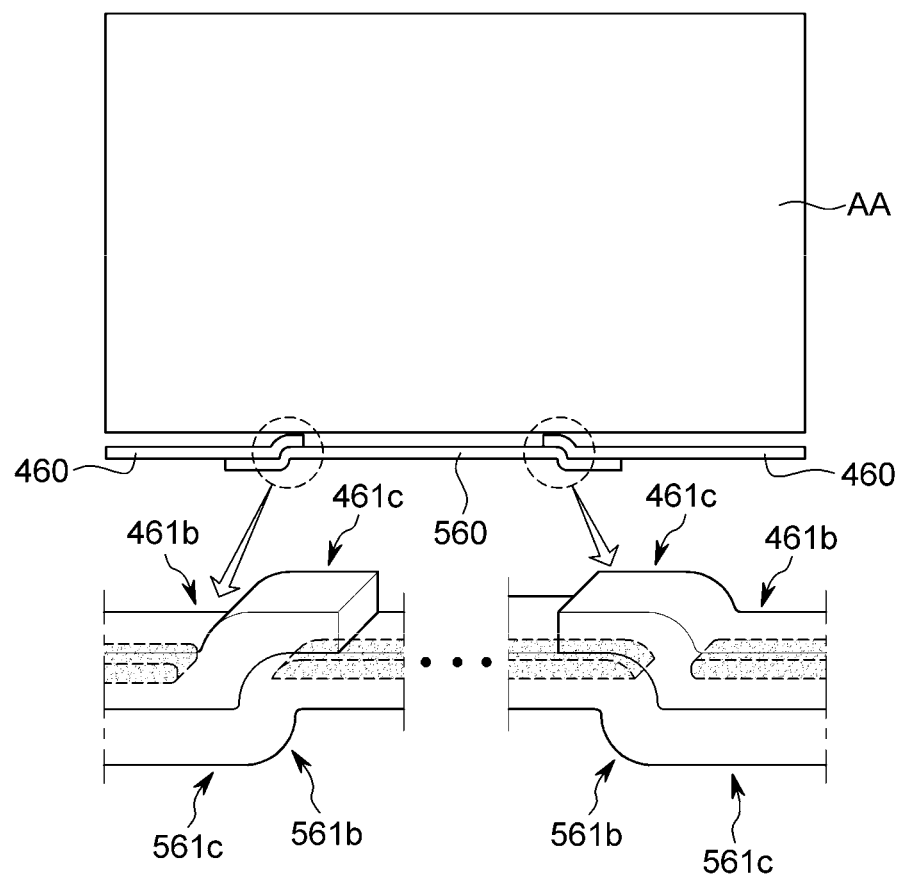

FIGS. 8A and 8C are a schematic plan view illustrating a quantum dot container according to another embodiment of the inventive concept mounted in a display device.

Referring to FIG. 8A, two quantum dot containers 560 are disposed at a lower portion of an active area AA (or display area) of the display device. The active area AA may be configured to display images according to image signals provided to the display device. In embodiments of the inventive concept, positions and the number of the quantum dot containers 560 may be configured, for example, according to the size of the active area AA.

Referring to FIG. 8, the two quantum dot containers 560 may be longitudinally aligned with each other at a lower portion of the active area AA.

In this case, the bent portion 561b of one quantum dot container 560 may be in contact with the bent portion 561b of another quantum dot container 560. The bent portion 561b of one quantum dot container 560 may overlap the end portion 561c of another quantum dot container 560.

As illustrated in FIG. 8, the bent portion 561b of one quantum dot container 560 overlaps the bent portion 561b of another quantum dot container 560 so that the lower portion of the active area AA is almost entirely covered with the emission areas of the quantum dot container.

Referring to FIGS. 8B and 8C, two quantum dot containers 460 and one quantum dot containers 560 are disposed at a lower portion of an active area AA (or display area) of the display device. Two quantum dot containers 460 and one quantum dot containers 560 may be longitudinally aligned with each other at a lower portion of the active area AA.

In this case, the bent portion 461b of one quantum dot container 460 may be in contact with the bent portion 561b of another quantum dot container 560.

Figure 9:
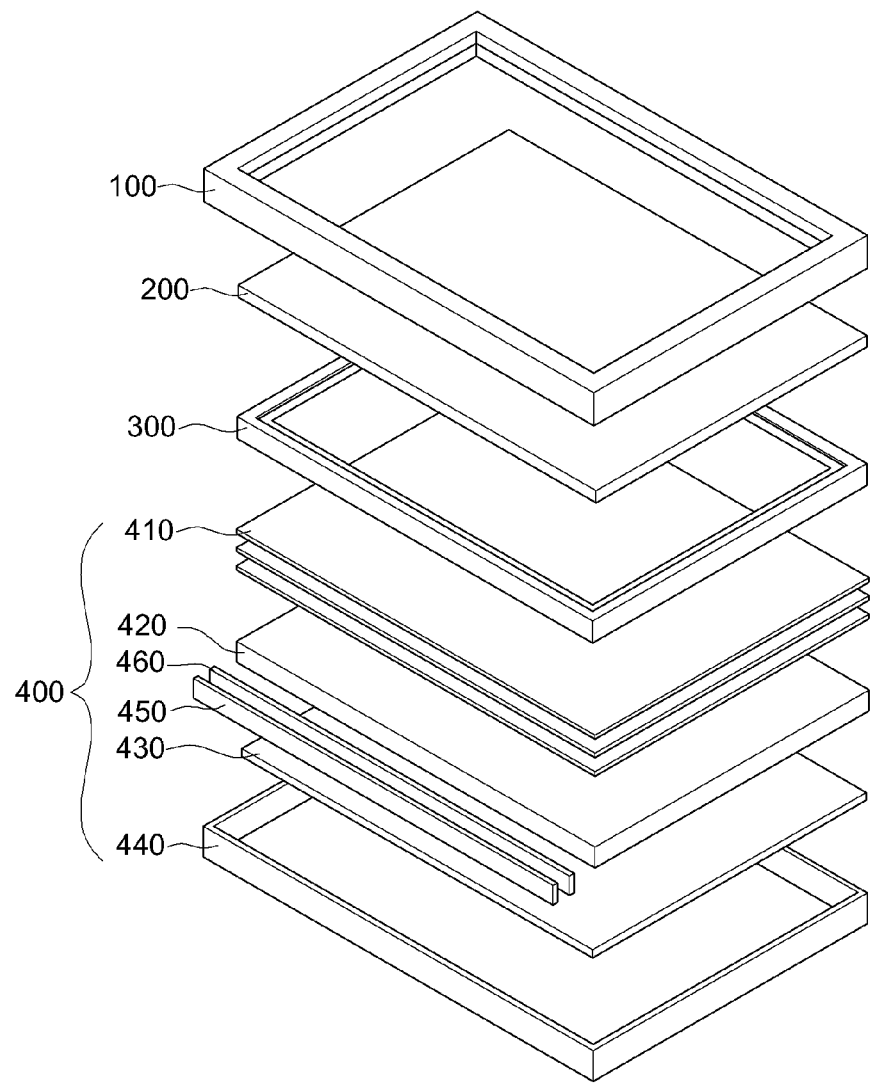
FIG. 9 is an exploded perspective view illustrating a display device including a quantum dot container according to an embodiment of the inventive concept.

FIG. 9 is an exploded perspective view illustrating a display device including a quantum dot container according to an embodiment of the inventive concept.

Referring to FIG. 9, the display device includes a display panel 200 (e.g., a liquid crystal display panel 200) configured to display an image according to an input signal, a backlight assembly 400 configured to supply light to the display panel 200, a top case 100 provided to cover the display panel 200, and a mold frame 300 configured to connect the top case 100 to a bottom case 440 and to support the display panel 200.

The mold frame 300 is coupled to the bottom case 440 and accommodates the display panel 200. The mold frame 300 may be formed of a flexible material, such as plastic, in order to absorb impact and protect the display panel 200.

The top case 100 is coupled to the mold frame 300 and the bottom case 440 so as to cover the display panel 200 seated on the mold frame 300. The top case 100 has an open window (which may be positioned in the middle of the top case 100) to expose the active area AA (or display area) of the display panel 200. The top case 100 may include a bezel that may cover and/or overlap a non-active area of the display panel 200 that surrounds the active area AA of the display panel. Each of end portions 461c and 461d of the quantum dot container 460 may overlap the bezel in a direction parallel to the extension direction of the quantum dot container 460. The phosphor 462 and/or the phosphor-container cavity of the body 461 may be positioned between the first end portion 461c and the second end portion 461d in the extension direction of the quantum dot container 460. The top case 100 may be connected to the mold frame 300 and the bottom case 440 by hooks and/or screws. The top case 100 and the bottom case 440 can be coupled to each other through one or more of a variety of methods and/or mechanisms.

The backlight assembly 400 includes an optical sheet 410, a light guide plate 420, a reflective sheet 430, a bottom case 440, a light source unit 450, and a quantum dot container 460.

The light source unit 450 may be disposed at a corner or on a side of the light guide plate 420. The light source unit 450 may emit light toward a light incident surface at a corner portion or a side surface of the light guide plate 420.

The light source unit 450 may include at least one LED chip (not shown) and a package (not shown) for accommodating the LED chip.

A light source unit 450 may be formed on one side surface, each of two side surfaces, or each of four side surfaces of the light guide plate 420. A light source unit 450 may be formed on at least one edge of the light guide plate 420. One or more light source units 450 may be deployed in consideration of the size, the brightness uniformity requirements, and/or other factors associated with the display panel 200.

Light emitted from the light source unit 450 is incident toward at least one incident surface of the light guide plate 420. The light guide plate 420 may substantially uniformly supply light (from a surface other than the incident surface) toward the display panel 200.

The light guide plate 420 is disposed close to the light source unit 450 and is accommodated in the bottom case 440. The light guide plate 420 may be provided in the form of, for example, a quadrilateral plate having a footprint as large as a footprint of the display panel 200. In embodiments of the inventive concept, the light guide plate 420 may have one or more of various shapes and/or may include predetermined grooves, protrusions, and/or other structures according to the position(s) of the light source(s).

The light guide plate 420 may be a plate, a sheet, or a film and may facilitate slimness of display devices.

The light guide plate 420 may be formed of a light-transmissive material such as, for example, an acrylic resin such as polymethylmethacrylate (PMMA) or polycarbonate (PC) so as to guide light efficiently.

A pattern may be formed on at least one surface of the light guide plate 420. For example, on a lower surface, a scattering pattern (not shown) may be formed so as to scatter and/or reflect the guided light upwards.

The optical sheet 410 is disposed on an upper portion of the light guide plate 420. The optical sheet 410 may diffuse and/or collect light transmitted from the light guide plate 420.

The optical sheet 410 may include one or more of a diffusion sheet, a prism sheet, a protective sheet, and/or one or more other functional sheets.

The diffusion sheet may disperse light incident from the light guide plate 420 so as to prevent the light from being partly concentrated.

The prism sheet may include prisms having a triangular cross-section and formed in a predetermined array on one surface of a base film. This prism sheet is disposed on the diffusion sheet and thus may collect light diffused from the diffusion sheet in a direction perpendicular to the display panel 200.

The protective sheet may be formed on the prism sheet. The protective sheet serves to protect a surface of the prism sheet and to diffuse light for uniform distribution of light.

The reflective sheet 430 is disposed between the light guide plate 420 and the bottom case 440, so that light emitted downwards from the light guide plate 420 is reflected toward the display panel 200, thereby increasing light efficiency.

The reflective sheet 430 may be formed of, for example, polyethylene terephthalate (PET) so as to possess reflectance property. One surface of the reflective sheet may be coated with a diffusion layer containing, for example, titanium dioxide. In an embodiment, the reflective sheet 430 may be formed of a material containing a metal, such as silver (Ag).

The bottom case 440 may accommodate the reflective sheet 430 and the light guide plate 420. A bottom surface of the bottom case 440 is formed parallel to the light guide plate 420.

The bottom case 440 may be formed of a metal material having hardness, such as stainless steel, or a material having good heat dissipation properties, such as aluminum or an aluminum alloy. The bottom case 440 is responsible for maintaining a framework of the display device and protecting a variety of components accommodated therein.

In order to realize white light with high color reproducibility, the quantum dot container 460 is disposed between the light source unit 450 and the light guide plate 420.

According to an embodiment of the inventive concept, the quantum dot container 460 may include at least one bent portion at one end portion.

As can be appreciated from the foregoing, various embodiments of the inventive concept have been described herein for purposes of illustration. Various modifications may be made without departing from the scope and spirit of the inventive concept defined by the following claims and equivalents of the claims.

What is claimed is:

1. A quantum dot container comprising:
   a body having a cavity; and a phosphor disposed inside the cavity,
wherein the body comprises:
- a light transmitting portion, the entire light transmitting portion having a straight line shape and extending in a direction; and
- a first bent portion connected to one end of the light transmitting portion and extending at a predetermined angle with respect to the direction in which the light transmitting portion extends,
- wherein the first bent portion does not include the phosphor.

2. The quantum dot container of claim 1, wherein the body further comprises a first end portion extending from the bent portion substantially in parallel with the direction in which the light transmitting portion extends.

3. The quantum dot container of claim 2, wherein the first end portion is a non-emission portion in which the phosphor is not disposed.

4. The quantum dot container of claim 2, wherein the body further comprises a second bent portions connected to the other end of the light transmitting portion and extending at a predetermined angle with respect to the direction in which the light transmitting portion extends.

5. The quantum dot container of claim 4, wherein the first bent portion and the second bent portion extend in different directions from each other.

6. The quantum dot container of claim 5, wherein the first bent portion and the second bent portion extend in directions opposite to each other.

7. The quantum dot container of claim 4, wherein the first bent portion and the second bent portion extend in a same direction.

8. A display device comprising:
a display panel configured to display an image;
a light source;
a light guide member overlapping the display panel and overlapping the light source; and
a first quantum dot container disposed between the light source and the light guide member,
wherein the first quantum dot container comprises:
- a light transmitting portion, the entire light transmitting portion having a straight line shape, extending in a direction and including a first end and a second end; and
- a first bent portion connected to the first end and extending at a predetermined angle with respect to the direction in which the light transmitting portion extends,
- wherein the first bent portion does not include the phosphor.

9. The display device of claim 8, wherein the first quantum dot container further comprises a first end portion extending from the first bent portion substantially in parallel with the direction in which the light transmitting portion extends.

10. The display device of claim 8, wherein the first end portion is a non-emission portion.

11. The display device of claim 10, wherein the quantum dot container further comprises a second bent portion extending from the other end portions of the light transmitting portion.

12. The display device of claim 11, wherein the second bent portion extends in a same direction as the first bent portion extends.

13. The display device of claim 12, the display device further comprises a second quantum dot container including a third bent portion and a third quantum dot container including a fourth bent portion,
wherein the first bent portion overlaps the third bent portion, and
wherein the second bent portion overlaps the fourth bent portion.

14. The display device of claim 11, wherein the second bent portion extends in a direction opposite to a ditection in which the first bent portion extends.

15. The display device of claim 14, the display device further comprises a second quantum dot container including a third bent portion and a third quantum dot container including a fourth bent portion,
wherein the first bent portion overlaps the third bent portion, and
wherein the second bent portion overlaps the fourth bent portion.

16. The display device of claim 8, further comprising a second quantum dot container including a second end portion,
wherein the first end portion of the first quantum dot container overlaps a second end portion of the second quantum dot container.

17. The display device of claim 8, further comprising a second quantum dot container including a second bent portion and a second end portion,
wherein the first bent portion of the first quantum dot container is in contact with the second end portion of a second quantum dot container.

18. The display device of claim 17, wherein the first bent portion and the second bent portion extend in different directions from each other.

19. The display device of claim 17, wherein the first bent portion of the first quantum dot container overlaps an end portion of the second quantum dot container.

20. The display device of claim 17, wherein the first bent portion of the first quantum dot container is in contact with a second bent portion of the second quantum dot container.

* * * * *